United States Patent
Moreno et al.

(10) Patent No.: US 6,454,240 B1
(45) Date of Patent: Sep. 24, 2002

(54) ANTI-EXTRUSION RING FOR USE IN CONJUNCTION WITH A VEHICLE SOLENOID VALVE

(75) Inventors: Alejandro Moreno, El Paso, TX (US); David Fredrick Reuter, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/774,927

(22) Filed: Jan. 31, 2001

(51) Int. Cl.⁷ .............................................. F16K 31/02
(52) U.S. Cl. ................................ 251/129.15; 303/119.2
(58) Field of Search .................. 251/129.15; 303/119.2, 303/119.3

(56) References Cited

U.S. PATENT DOCUMENTS

| | | | |
|---|---|---|---|
| 4,749,201 A | * | 6/1988 | Hunger ........................ 277/165 |
| 5,425,575 A | * | 6/1995 | Schmidt et al. .......... 303/119.2 |
| 5,445,448 A | * | 8/1995 | Wolff et al. .............. 303/119.2 |
| 5,681,097 A | * | 10/1997 | Tackett et al. ...... 251/129.15 X |
| 5,683,151 A | * | 11/1997 | Friedow et al. .......... 303/119.2 |
| 5,730,509 A | * | 3/1998 | Eith et al. ................. 303/119.2 |
| 5,879,060 A | * | 3/1999 | Megerle et al. .......... 303/119.2 |
| 6,092,781 A | * | 7/2000 | Hohl et al. ............... 303/119.2 |
| 6,250,725 B1 | * | 6/2001 | Schnalzager et al. .... 303/119.2 |

* cited by examiner

*Primary Examiner*—Lesley D. Morris
*Assistant Examiner*—John Bastianelli
(74) *Attorney, Agent, or Firm*—Margaret A. Dobrowitsky

(57) ABSTRACT

An anti-extrusion ring for use in conjunction with a vehicle solenoid valve has a plano-concave cross-section. The anti-extrusion ring is used to support a seal that seals the interface between a solenoid valve and a bore within a valve fitting. When the solenoid valve is installed in the valve fitting, a bore-to-ring interference area is formed between the bore and the anti-extrusion ring and a debris capture area is formed above the bore-to-ring interference area. Thus, when the anti-extrusion ring controllably fractures during installation of the solenoid valve with the bore or due to vibration, debris from the ring will be captured in the debris capture area and prevented from entering a fluid system in which the vehicle solenoid valve is used. Moreover, the anti-extrusion ring deforms in a such a manner that accounts for the accumulation of the manufacturing tolerances of the solenoid valve and its corresponding fitting and in such a manner that allows the solenoid valve to maintain its center and proper alignment within its corresponding fitting. As such, extrusion of the "O" ring is reduced or eliminated.

10 Claims, 1 Drawing Sheet

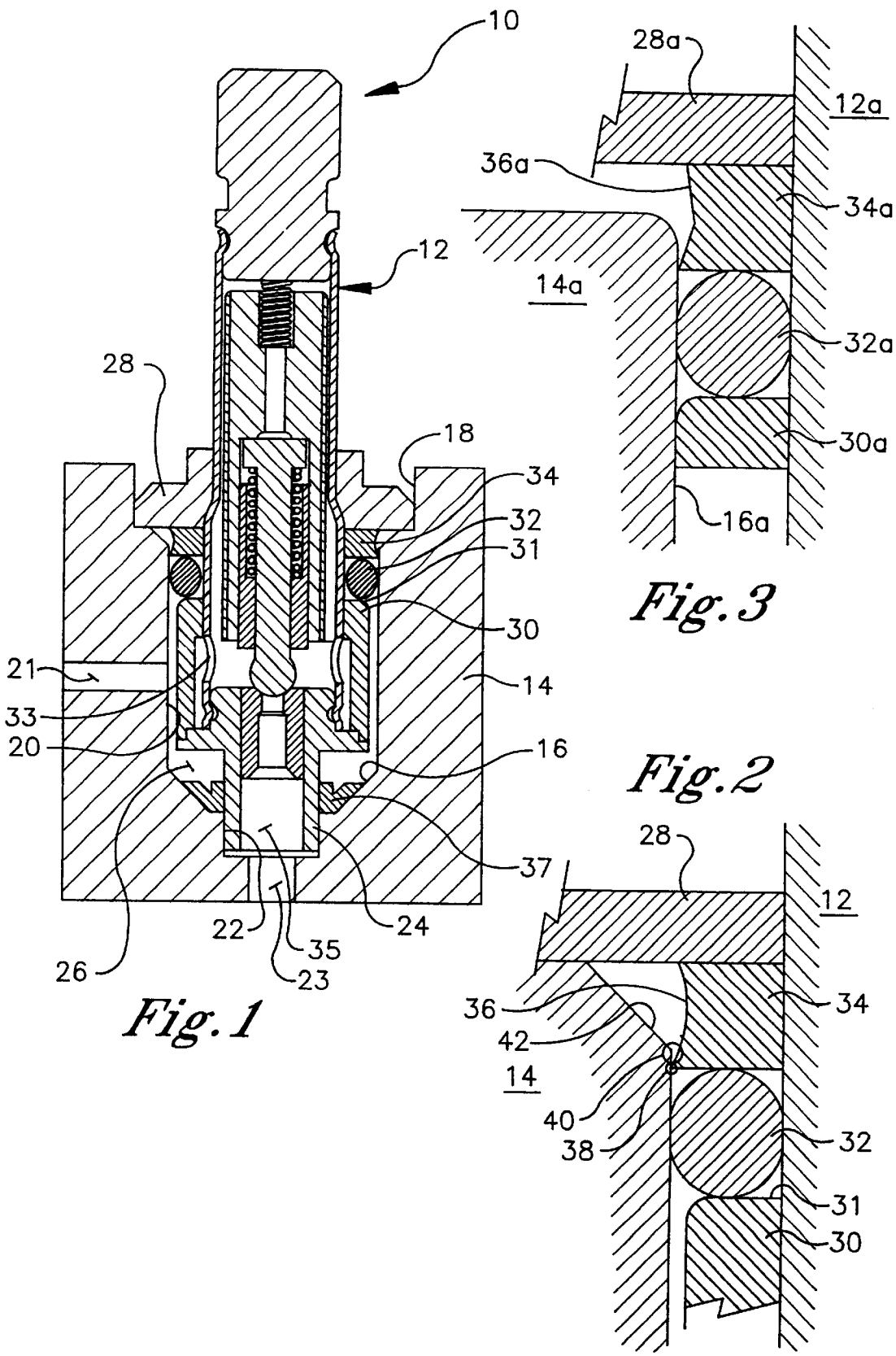

ANTI-EXTRUSION RING FOR USE IN CONJUNCTION WITH A VEHICLE SOLENOID VALVE

TECHNICAL FIELD

The present invention relates to devices used to seal vehicle fluid systems.

BACKGROUND OF THE INVENTION

Many of today's vehicles include numerous fluid based systems that incorporate several pressure modulators, e.g., solenoid valves, that control the flow of hydraulic fluid therein. As but one example, an anti-lock braking system, used to maintain vehicle control during extreme braking, is capable of modulating the pressure in the wheel brake cylinders in order to keep the wheels from slipping on the roadway during harsh braking conditions.

A typical anti-lock brake system can include several solenoid valves to control the hydraulic fluid pressure in the individual components, e.g., a master cylinder, and a plurality of wheel cylinders. Usually a solenoid valve is installed between the master cylinder and each wheel cylinder. In order to prevent fluid leaking from the ABS, a seal must be included between the solenoid valve and the corresponding bore in which the valve is inserted. The seal also isolates the parts, i.e., the valve and the corresponding fitting in which it is installed, from each other. The seal must operate under extremely harsh conditions, e.g., extreme temperatures, corrosive fluids, extreme vibration, and high fluid pressures. Elastomer seals supported by nylon back-up rings have been used in the harsh conditions described above. Unfortunately, component tolerances can produce radial clearances between the back-up ring outer diameter or back-up ring inner diameter and adjacent surfaces and these radial clearances can lead to seal extrusion. Additionally, while the valve is being inserted in its corresponding bore and during the life of the valve, the seal back-up ring can fracture unpredictably and uncontrollably and lead to seal extrusion, which can ultimately lead to leakage and failure of the valve.

The present invention has recognized the above-mentioned prior art drawbacks, and has provided the below-disclosed solutions to one or more of the prior art deficiencies.

SUMMARY OF THE INVENTION

An anti-extrusion ring has a plano-concave cross-section and is used in conjunction with a vehicle solenoid valve. In a preferred embodiment, the solenoid valve includes a filter that forms a seal contact face. A seal surrounds the solenoid valve adjacent to the seal contact face. The anti-extrusion ring is installed around the solenoid valve such that it is sandwiched between the seal and a flange. Preferably, the anti-extrusion ring is installed in a bore such that a bore-to-ring interference area is formed between the bore and the anti-extrusion ring and a debris capture area is formed above the bore-to-ring interference area.

If the anti-extrusion ring fractures during the installation of the solenoid valve or during the life of the solenoid valve, debris capture area prevents any debris from entering the fluid system in which the solenoid valve is installed. Moreover, the anti-extrusion ring deforms in such a manner to account for variations in the outer diameter of the solenoid valve and variations in the inner diameter of the fitting due to the predetermined manufacturing tolerances of these parts. As such, extrusion of the seal due to high fluid pressure is reduced or eliminated.

In another aspect of the present invention, a solenoid valve includes a valve fitting that forms a bore. Disposed within the bore is a solenoid valve that forms a seal contact face. A flange is installed around the solenoid valve to hold the solenoid valve within the bore and a seal is disposed around the solenoid valve in contact with the seal contact face. An anti-extrusion ring is sandwiched between the flange and the seal. In this aspect of the present invention, the anti-extrusion ring is configured such that a bore-to-ring interference area is formed between the bore and the anti-extrusion ring and a debris capture area is formed above the bore-to-ring interference area.

In still another aspect of the present invention, a fluid connection includes a fluid fitting that is formed with a bore. A fluid device is disposed within the bore and includes a first physical member and a second physical member installed there around. A seal is disposed around the fluid device in contact with the second physical member. Moreover, an anti-extrusion ring is sandwiched between the first physical member and the seal.

The present invention will now be described, by way of example, with reference to the accompanying drawings, in which:

BRIEF DESCRIPTION OF THE DRAWINGS

FIG. 1 is a cross-sectional view of a solenoid valve connection;

FIG. 2 is a detail view of the seal configuration as indicated by box 2 in FIG. 1; and FIG. 3 is a cross-sectional view of a fluid connection that includes an alternative anti-extrusion ring.

DESCRIPTION OF AN EMBODIMENT OF THE INVENTION

Referring initially to FIG. 1, a solenoid valve connection is shown and generally designated 10. FIG. 1 shows that the valve connection 10 includes a solenoid valve 12 that is installed a correspondingly sized and shaped fitting 14. As shown in FIG. 1, the fitting 14 is formed with a bore 16 having an upper portion 18, a medial portion 20, and a lower portion 22. Moreover, the fitting 14 forms at least one inlet port 21 and at least one outlet port 23. The solenoid valve 12 defines a distal end 24 that is sized to fit into the lower portion 22 of the bore 16. Around the distal end 24 of the solenoid valve 12 is a high pressure fluid chamber 26. Moreover, a flange 28 that is sized to fit into the upper portion 18 of the bore 16 surrounds the solenoid valve 12. The outer periphery of the flange 28 engages the upper portion 18 of the bore 16 to support the solenoid valve 12 within the fitting 14.

As shown in FIG. 1, the solenoid valve 12 includes a filter 30 that forms a seal contact face 31. An elastomeric seal 32 having a round cross-section, i.e., an "O" ring, surrounds the solenoid valve 12 such that it maintains contact with the seal contact face 31 during insertion of the valve 12 into the fitting 14. Under pressure, the seal 32 will move slightly upward, looking at FIG. 1, and contact with the seal contact face 31 will be lost. In turn, an anti-extrusion ring 34 is sandwiched between the flange 28 and the seal 32. As intended by the present invention, the anti-extrusion ring 34 supports the seal 32 and prevents it from being extruded from the bore 16.

FIG. 1 shows that the solenoid valve 12 is formed with at least one inlet port 33 and at least one outlet port 35. Thus, when the valve 12 is installed in the fitting 14 as shown the inlet port 33 of the solenoid valve 12 communicates with the inlet port 21 of the fitting and the outlet port 35 of the solenoid valve 12 communicates with the outlet port 23 of the fitting 14. As shown in FIG. 1, a lip seal 37 circumscribes the distal end 24 of the solenoid valve 12. The lip seal 37 isolates the inlet ports 21, 33 from the outlet ports 23, 35.

Referring now to FIG. 2, details concerning the anti-extrusion ring 34 can be seen. FIG. 2 shows that the cross-section of the anti-extrusion ring 34 is plano-concave. More specifically, the anti-extrusion ring 34 includes at least one curved, e.g., concave, surface 36. FIG. 2 shows that the curved surface 36 has a backwards "C" shape. More broadly, the anti-extrusion ring 34 includes at least one surface 36 which is not a straight parallel surface relative to the fitting 14. As shown in FIG. 3, the anti-extrusion ring 34a can include an inwardly-slanted surface 36a that has a backwards "K" shape. Moreover, FIG. 3 shows that the anti-extrusion ring 34a can be used to back up an "O" ring 32a between nearly any first physical member 28a and any second physical member 30a that are part of a pressurized fluid device 12a installed in a pressurized fitting 14a formed with a bore 16a.

Returning to FIG. 2, when the anti-extrusion ring 34 is installed in the bore 16, component tolerances are such that a bore-to-ring interference area 38 is formed between the bore 16 and the anti-extrusion ring 34. Owing to the curved surface 36, above the bore-to-ring interference area 38 is a debris capture area 40. The debris capture area 40 can be further formed by a slanted inner surface 42 of the fitting 14 that tapers away from the anti-extrusion ring 34. Thus, due to the curved surface 36, fracture of the anti-extrusion ring 34 during installation of the solenoid valve 12 in the fitting 14, or during the useful life of the valve connection 10, occurs in a controlled manner. In other words, if the anti-extrusion ring 34 fractures, debris from the ring 34 will be captured in the debris capture area 40 and prevented from entering the high pressure fluid chamber 26 and the fluid system in which the anti-extrusion ring is used 12.

Additionally, the anti-extrusion ring 34 will readily deform at the bore-to-ring interference area 38 to account for variations in the outer diameter of the solenoid valve 12 and variations in the inner diameter of the fitting 14 due to the predetermined manufacturing tolerances of these parts. It is to be understood that any force on the anti-extrusion ring 34 is distributed around the anti-extrusion ring 34 at the bore-to-ring interference area 38 and as the anti-extrusion ring 34 deforms, its center is maintained and the solenoid valve 12 remains properly aligned within the valve fitting 14.

With the configuration of structure described above, it is to be appreciated that the anti-extrusion ring for use in conjunction with a vehicle solenoid valve provides a means for supporting an elastomeric seal in a valve connection. The shape of the anti-extrusion ring 34, i.e., the plano-concave cross-section, creates a debris capture area 40 when installed in a fitting 14. Thus, any debris from the anti-extrusion ring 34 is prevented from entering the fluid system in which the present invention is installed. Moreover, the anti-extrusion ring deforms in a such a manner that accounts for the accumulation of the manufacturing tolerances of the solenoid valve 12 and its corresponding fitting 14. The anti-extrusion ring also deforms in such a manner that allows the solenoid valve 12 around which it is installed to maintain its center and proper alignment of the valve 12 within its corresponding fitting 14. As such, extrusion of the "O" ring 32 due to high fluid pressure within the solenoid valve connection 10 is reduced or eliminated.

While the ANTI-EXTRUSION RING FOR USE IN CONJUNCTION WITH A VEHICLE SOLENOID VALVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A solenoid valve connection, comprising:

a valve fitting formed with a bore;

a solenoid valve disposed within the bore, the solenoid valve including a filter formed with a seal contact face;

a flange installed around the solenoid valve to hold the solenoid valve within the bore;

a seal disposed around the solenoid valve in contact with the seal contact face; and an anti-extrusion ring sandwiched between the flange and the seal, the anti-extrusion ring defining a bottom and a lower inner edge circumscribing the bottom, the anti-extrusion ring being configured such that a bore-to-ring interference area is formed between the bore and the lower inner edge of the anti-extrusion ring and a debris capture area is formed above the bore-to-ring interference area.

2. The solenoid valve of claim 1, wherein the anti-extrusion ring includes at least one curved surface.

3. The solenoid valve of claim 2, wherein the curved surface is "C" shaped.

4. The solenoid valve of claim 1, wherein the anti-extrusion ring includes at least one slanted surface.

5. The solenoid valve of claim 4, wherein the slanted surface is "K" shaped.

6. A fluid connection comprising:

a fluid fitting formed with a bore;

a fluid device disposed within the bore, the fluid device including a first physical member and a second physical member installed there around;

a seal disposed around the fluid device in contact with the second physical member; and an anti-extrusion ring sandwiched between the first physical member and the seal, the anti-extrusion ring defining a bottom and a lower inner edge circumscribing the bottom, the lower inner edge of the anti-extrusion ring engaging the bore to form a bore-to-ring interference area.

7. The fluid connection of claim 6, wherein the anti-extrusion ring includes at least one curved surface.

8. The fluid connection of claim 7, wherein the curved surface is "C" shaped.

9. The fluid connection of claim 6, wherein the anti-extrusion ring includes at least one slanted surface.

10. The fluid connection of claim 9, wherein the slanted surface is "K" shaped.

* * * * *